United States Patent [19]

Thiel et al.

[11] Patent Number: 5,586,256
[45] Date of Patent: Dec. 17, 1996

[54] COMPUTER SYSTEM USING MULTIDIMENSIONAL ADDRESSING BETWEEN MULTIPLE PROCESSORS HAVING INDEPENDENTLY ADDRESSABLE INTERNAL MEMORY FOR EFFICIENT REORDERING AND REDISTRIBUTION OF DATA ARRAYS BETWEEN THE PROCESSORS

[75] Inventors: Geoffrey L. Thiel; Paul S. Pontin, both of Surrey, United Kingdom

[73] Assignee: Akebia Limited, Surrey, United Kingdom

[21] Appl. No.: 553,546

[22] Filed: Jul. 13, 1990

[30] Foreign Application Priority Data

Jul. 20, 1989 [EP] European Pat. Off. ............ 89 307362

[51] Int. Cl.$^6$ .................................................. G05B 15/00
[52] U.S. Cl. .................... 395/200.03; 395/507; 364/133; 364/231.9; 364/255.1; 364/228; 364/DIG. 1
[58] Field of Search ..................................... 395/200, 375, 395/800, 400, 200.03, 165; 364/242.94, 260, 260.1, 927.98, 931.79, 133, 931.01

[56] References Cited

U.S. PATENT DOCUMENTS

| | | | |
|---|---|---|---|
| 3,851,313 | 11/1974 | Chang | 365/239 |
| 4,045,781 | 8/1977 | Levy et al. | 395/775 |
| 4,051,551 | 9/1977 | Lawrie et al. | 364/200 |
| 4,107,780 | 8/1978 | Grimsdale et al. | 364/521 |
| 4,163,280 | 7/1979 | Mori et al. | 395/400 |
| 4,210,879 | 1/1980 | Pandeya | 395/425 |
| 4,222,102 | 9/1980 | Jansen et al. | 395/250 |
| 4,231,088 | 10/1980 | Hammer et al. | 395/425 |

(List continued on next page.)

FOREIGN PATENT DOCUMENTS

| | | |
|---|---|---|
| 1-37787 | 8/1989 | Japan . |
| 1491453 | 11/1977 | United Kingdom . |
| 2017987 | 10/1979 | United Kingdom . |
| 2044580 | 10/1980 | United Kingdom . |
| 1578205 | 11/1980 | United Kingdom . |
| 2086624 | 5/1982 | United Kingdom . |
| 2168182 | 6/1986 | United Kingdom . |

OTHER PUBLICATIONS

1986 Proceedings Fall Joint Computer Conference, "Autonomous Decentralized Software Structure and Its Application", Kinji Mori et al, pp. 1056–1063.

"Nedips: A Non–von Neumann High–Speed Computer", Nobuyasu Ito et al, Jul. 1985, pp. 83–90.

"Multiprocessor scheme with application to macro–dataflow," Abdulkarim Ayyad et al, Jun. 1987, pp. 255–263.

Technology Updates, "Software machine model blazes trail for parallel processing", Tom Williams, Oct. 1, 1988, pp. 20, 22, 24, 26.

"Topological Comparison of Static Multiprocessing Networks," Ran Ginosar et al, Technion–Israel Institute of Technology, May 23, 1989, pp. 1–4.

*Primary Examiner*—Thomas C. Lee
*Assistant Examiner*—Sang Hui Kim
*Attorney, Agent, or Firm*—Flynn, Thiel, Boutell & Tanis, P.C.

[57] ABSTRACT

A computer system includes sixteen data processors each connected to a communication bus. The communication bus comprises a data bus for carrying data, and an address bus for carrying associated labelling information uniquely identifying the data. Each processor includes read and write detectors connected to the address bus for detecting labelling information of data required by, or presently stored in, respectively, the data processor. A bulk memory having similar read and write detectors is connected to the communication bus. An address generator supplies labelling addresses to the address bus. For each address, one processor or the bulk memory supplies the corresponding data to the data bus, and other processors and/or the bulk memory requiring the data read the data from the data bus. Data is transferred between processors and/or the bulk memory in this way. The address bus and the read and write decoders are configured for multi-dimensional addressing.

28 Claims, 17 Drawing Sheets

U.S. PATENT DOCUMENTS

| | | | |
|---|---|---|---|
| 4,315,312 | 2/1982 | Schmidt | 395/425 |
| 4,344,130 | 8/1982 | Fung et al. | 395/425 |
| 4,459,664 | 7/1984 | Pottier et al. | 395/325 |
| 4,608,629 | 8/1986 | Nagel | 395/400 |
| 4,766,534 | 8/1988 | De Benedictis | 395/200 |
| 4,803,617 | 2/1989 | Berarducci | 364/200 |
| 4,809,159 | 2/1989 | Sowa | 364/200 |
| 4,855,903 | 8/1989 | Carleton et al. | 364/200 |
| 4,954,951 | 9/1990 | Hyatt | 395/425 |
| 4,959,776 | 9/1990 | Deerfield et al. | 395/425 |
| 5,086,498 | 2/1992 | Tanaka et al. | 395/200 |
| 5,293,481 | 3/1994 | Mita et al. | 395/163 |

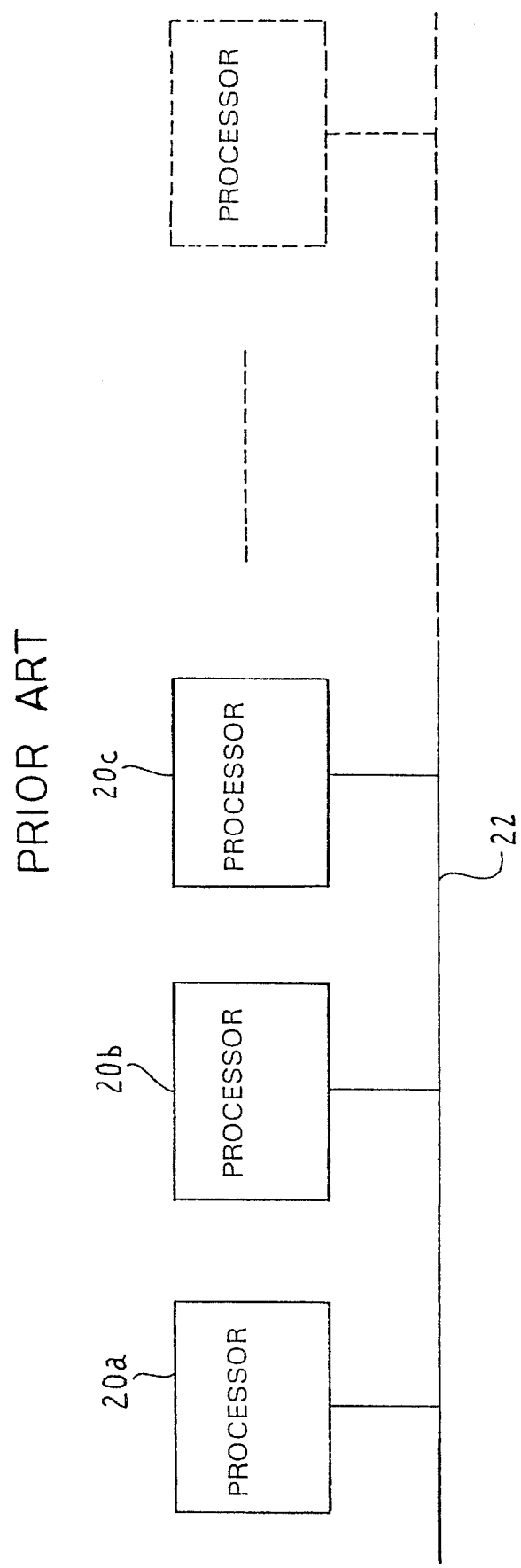

3 DIMENSIONAL AXIS
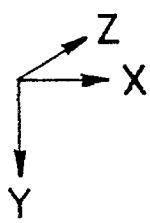
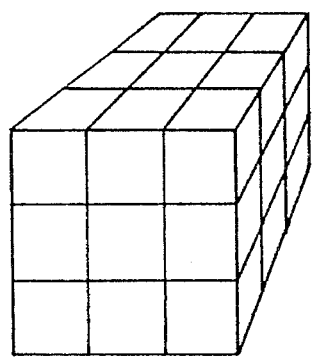
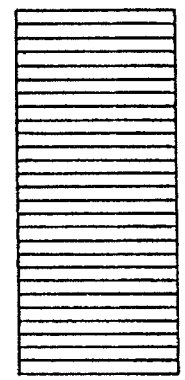
FIG. 2a    FIG. 2b
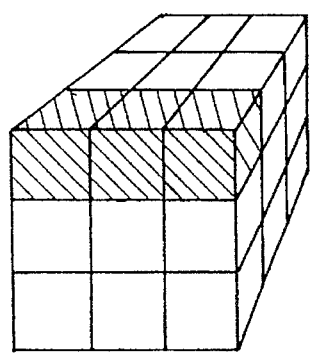
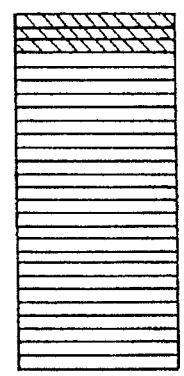
FIG. 2c    FIG. 2d
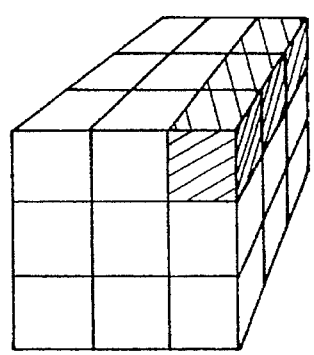
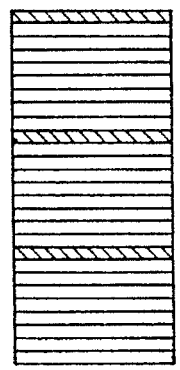
FIG. 2e    FIG. 2f

SOURCE MAPPING

DESTINATION MAPPING

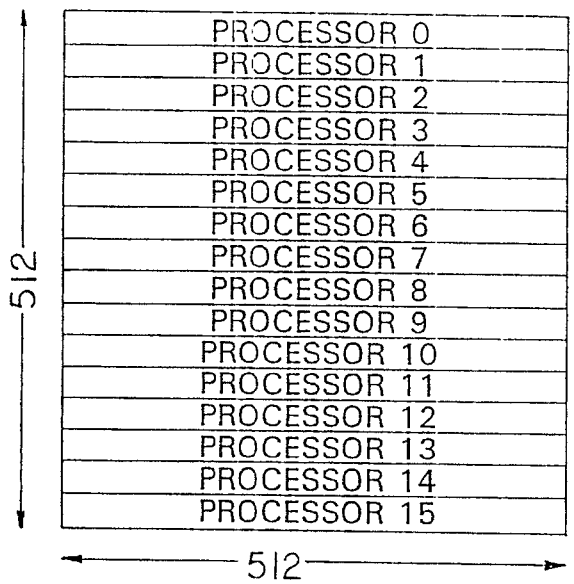
FIG. IIa
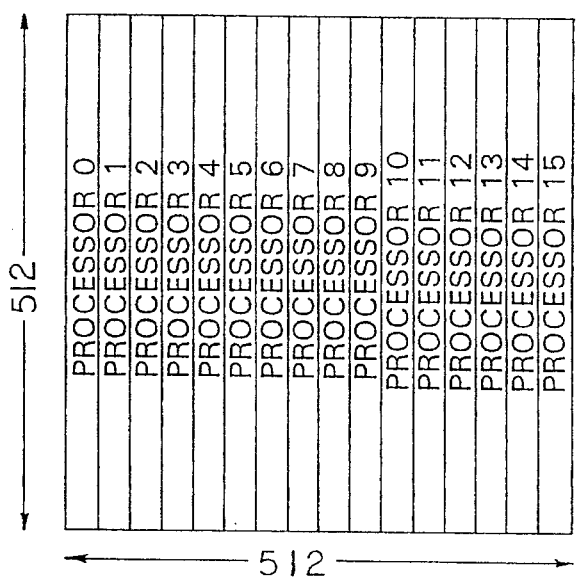
FIG. IIb
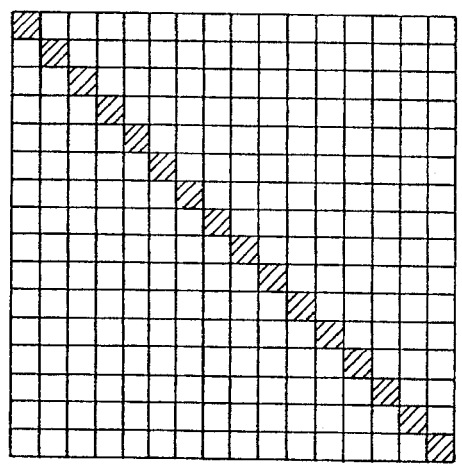
FIG. IIc

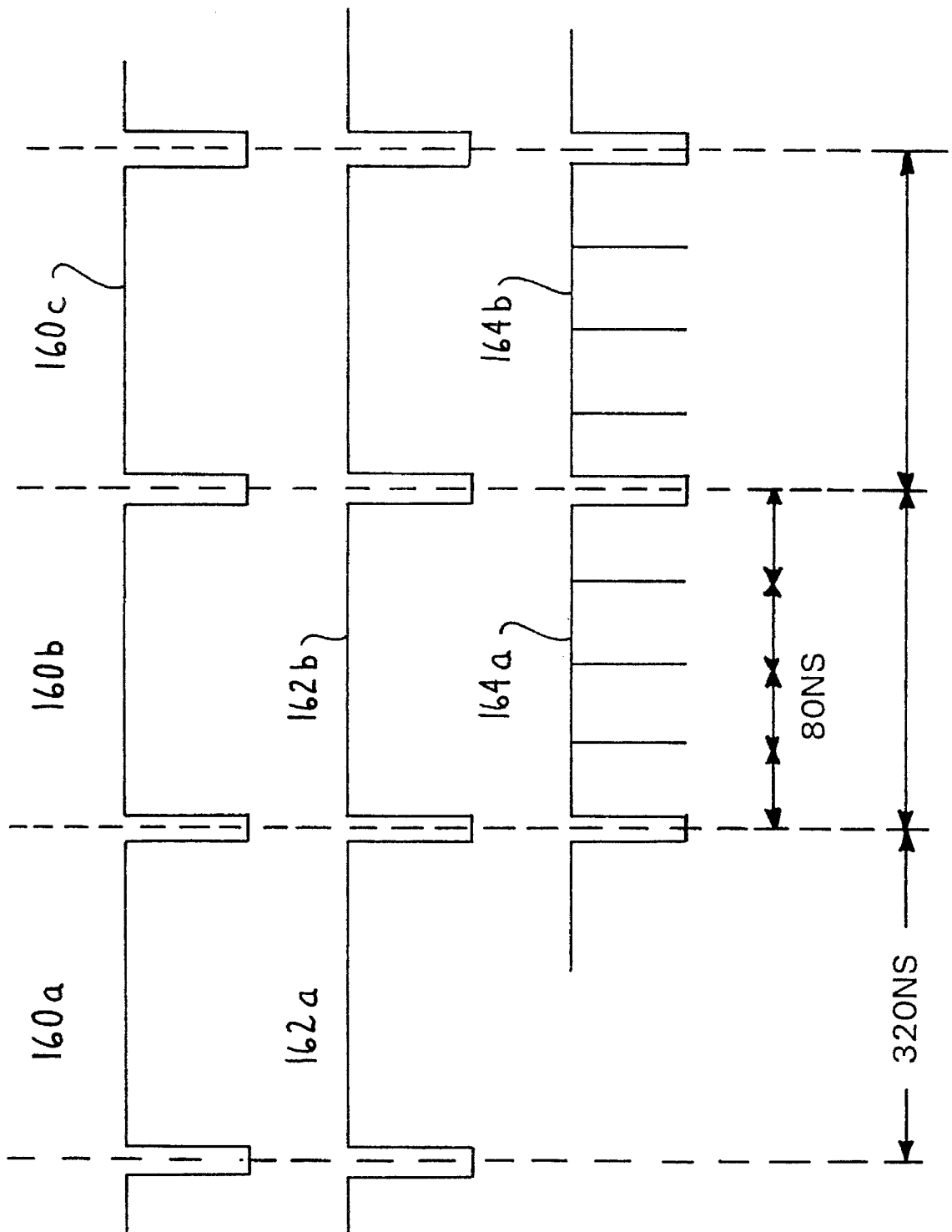

COMPUTER SYSTEM USING MULTIDIMENSIONAL ADDRESSING BETWEEN MULTIPLE PROCESSORS HAVING INDEPENDENTLY ADDRESSABLE INTERNAL MEMORY FOR EFFICIENT REORDERING AND REDISTRIBUTION OF DATA ARRAYS BETWEEN THE PROCESSORS

FIELD OF THE INVENTION

The present invention relates to the field of computer architecture for multi processor systems. In particular, the invention relates to systems in which the individual processors are interconnected by a common communication bus.

BACKGROUND OF THE INVENTION

A conventional multiprocessor system is shown schematically for example in FIG. 1 of the accompanying drawings. In transfer).

We have appreciated that a problem with the above system is caused by the manner in which the system hardware supports software organised data. Computer memory hardware is normally linearly addressed as a one dimensional array of words. Computer software on the other hand requires a variety of data structures of which the most common is the data array. The problem arises from the way in which a multi-dimensional data array maps onto the memory hardware. Items which are logically closely related in the software maybe scattered throughout the linearly addressed memory hardware. FIG. 2 illustrates the problem in the case of a 3 dimensional data array. A row of data in the X direction corresponds conveniently to a contiguous block in the memory hardware whereas a column of data in the Z direction is physically scattered throughout the entire memory. This effect can cause major delays within a parallel computer system because if a processor requires non-local data in any other direction than the X row direction the whole data array must be fetched to the local memory of the processor, which results in far more data being transferred than necessary. Alternatively, each element of the desired subset may be accessed individually creating many single word transfers which the hardware will not execute efficiently.

We have appreciated that another effect which leads to inefficiency in conventional systems takes place when several processors each require different but partially overlapping blocks of data. FIG. 3 illustrates a simplified example where four processors each require approximately half of the available data. Some areas of the source data are required by all four processors whereas other areas are required by two processors or just one processor. In a conventional parallel processor system the whole of the data has to be transferred to each of the local memories of processors, which wastes memory space. Alternatively the desired data blocks have to be unpacked, i.e. the data is arranged as separate blocks for each processor, and sent individually to each of the processors in turn, which would waste processor time and communication bandwidth.

In the above examples it has been assumed that the data source is a single memory. The situation becomes more complex when the source data array is mapped across the local memories of a number of processors, and it has to be re-distributed around the processors. This situation frequently arises from one algorithm stage to the next where the result data mapping from the first stage is not the same as the input data mapping required for the second. FIG. 4 illustrates this situation where four processors hold data in their local memories in row format (FIG. 4a) and the next algorithm stage requires the data in column format (FIG. 4b). The resulting data movements are quite complex even in this example of just four processes (FIG. 4c). In the above case a conventional system has to unpack and re-pack the data between the full array format and the sixteen sub-arrays illustrated. This is inefficient and wastes processor time.

An example of a prior art system is known from Japanese patent application no. 57-163924 to Hitachi, laid open on the 28th Mar. 1984 under the number 59-53964. In the system of that application a block of data can be sent from a control processor to several other processors simultaneously, under severe restrictions of the processors organisation. The system does not facilitate efficient re-organisation of data between the processors, and it does not overcome all of the problems described above.

SUMMARY OF THE INVENTION

The present invention is defined In the appended claims. According to the invention, a computer system includes a plurality of data processors, each being connected to a communication bus. The communication bus carries data and associated labelling information that uniquely identifies the data. Each processor includes a programmable read detector for detecting labelling information on the bus of data required by the data processor. Each data processor also includes a programmable write detector for detecting labelling information on the bus of data currently stored in the processor. The read and write detectors are independently programmable. During operation, the detectors in each processor are programmed with the appropriate labelling information of the data currently required by, and currently stored in, the processor. Whenever the labelling information on the bus corresponds to data required by any particular processor, the read detector of that processor detects the labelling information whereupon it causes the processor to read the corresponding data from the bus. Similarly, whenever the labelling information on the bus corresponds to data that is being stored a particular processor, the write detector of that processor detects the labelling information whereupon it causes the processor to write the corresponding data to the bus so that other processors may then read the data from the bus. Thus, in such a computer system, data may be distributed across a number of processors, without affecting the availability of the data on the communication bus. For data transfers and re-organisations, the read dector in each processor can be programmed with precisely the sub-set of data that the processor may require. During the data transfer, only the required data is loaded into that processor, leading to a memory efficient system.

In the preferred embodiment, the communication bus includes a data bus and an address bus, the address bus carrying the labelling information identifying the data. An address generator is coupled to the bus, and provides sequences of addresses on the bus. In use, once the read and write detectors of each processor have been initialised, the address generator provides a sequence of addresses to the bus. For each address, one of the processors has the associated data in its memory store, and that processor writes the data corresponding to the address on to the bus. Any other processors which require the data can then read the data into their own memories. Thus the system allows each processor to read a block of data which may overlap with that of another processor. During data reorganisations, the address generator need only generate the sequence of addresses once. During the single pass through the addresses, the corresponding data is automatically made available on the communication bus, and each processor reads from that data the sub-set of data that it requires.

In the preferred embodiment, the hardware is configured to handle multi-dimensional addresses as the labelling information. Thus the system can manipulate arrays of data without having to "unpack" and "repack" the array data into a linear format.

In another aspect of the invention, a computer system includes a plurality of data processors, each being connected to a communication bus. The communication bus carries data and associated labelling information that uniquely identifies the data. Each processor includes a read detector for detecting labelling information on the bus of data required by the data processor, and a write detector for detecting labelling information on the bus of data currently stored by the processor. During operation, for each bit of labelling information, each processor operates firstly on a write cycle during which the write detector detects whether the labelling information on the bus corresponds to data currently held by the processor. If such labelling information is detected, the associated data is written from the processor on to the bus. After the write cycle, each processor operates on a read cycle during which the read detector detects whether the labelling information on the bus corresponds to data required by the processor. If such labelling information is detected, the associated data on the bus is read in to the processor. Thus for each bit of labelling information, data can be written from one processor on to the bus, and read by any other processors that require the same data. This overcomes the problem of requiring complicated data paths between processors for transferring and reorganising data between the processors.

As will be described with reference to the embodiment below, the present invention enables efficient re-ordering or redistribution of data arrays between processors. By programming each processor, during data transfers, each processor can receive precisely the subset of data H requires, thereby optimising the usage of local memory in each processor. Individual processors can conveniently access any part of the data by means of the communication bus, even though the data may be in an array distributed across the many physically separate memories in the system.

BRIEF DESCRIPTION OF THE DRAWINGS

An embodiment of the invention will now be described by way of example with reference to the remaining figures of the accompanying drawings, in which:

FIG. 1 is a block diagram illustrating how a number of different microprocessors are conventionally connected to a single communications bus;

Figure 3:
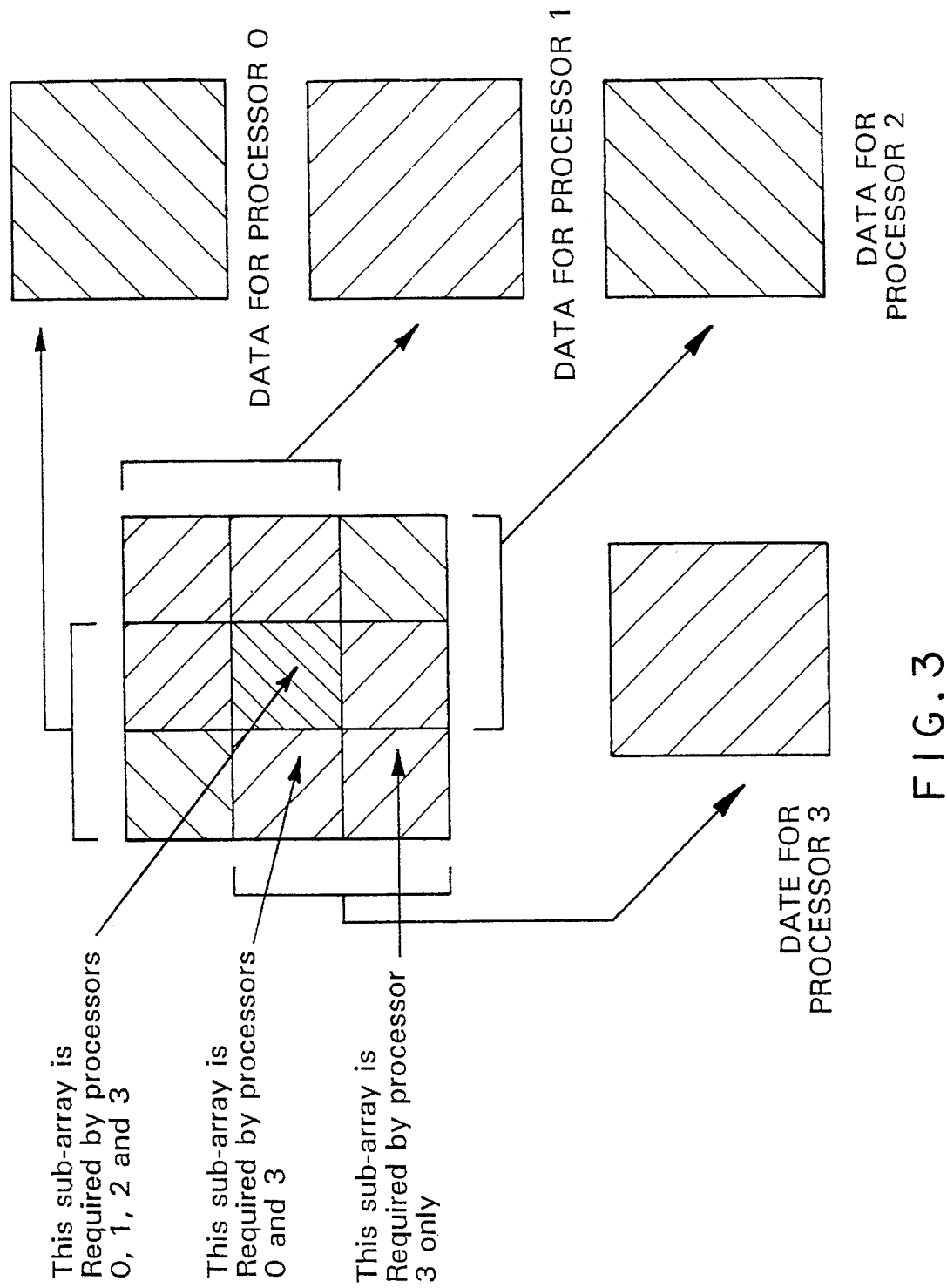
Figure 4A:
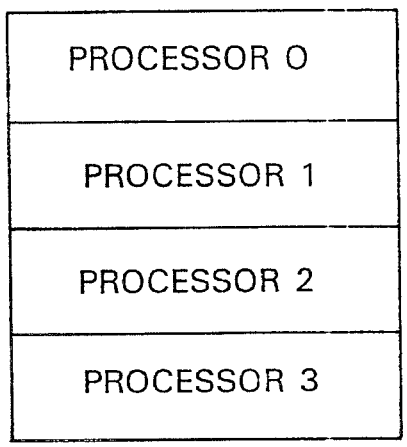
Figure 4B:
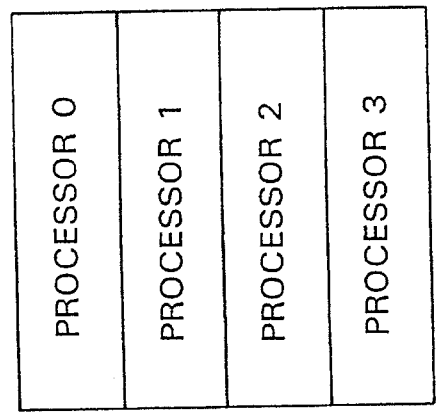
Figure 4C:
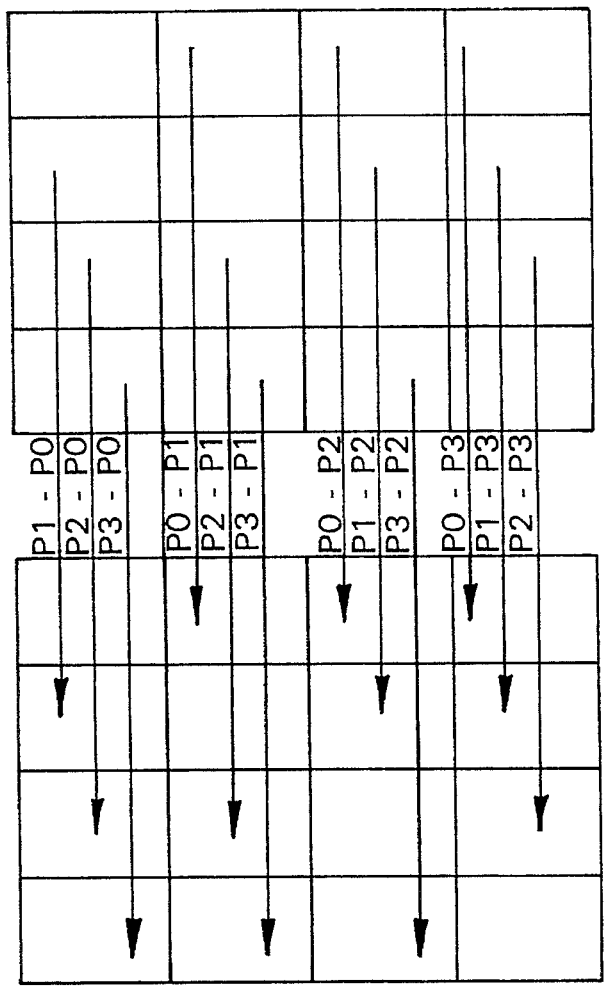
Figure 5:
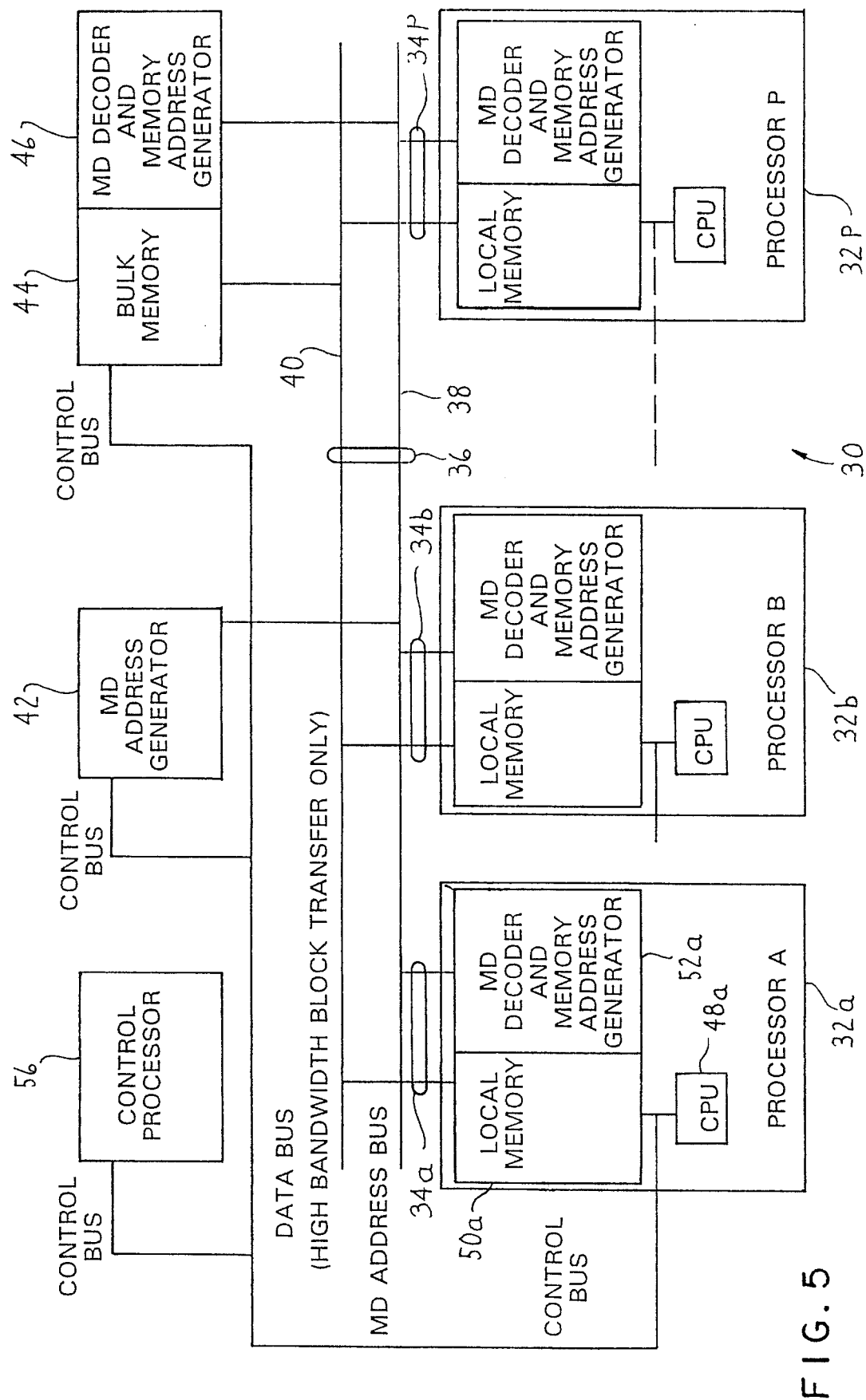
Figure 6A:
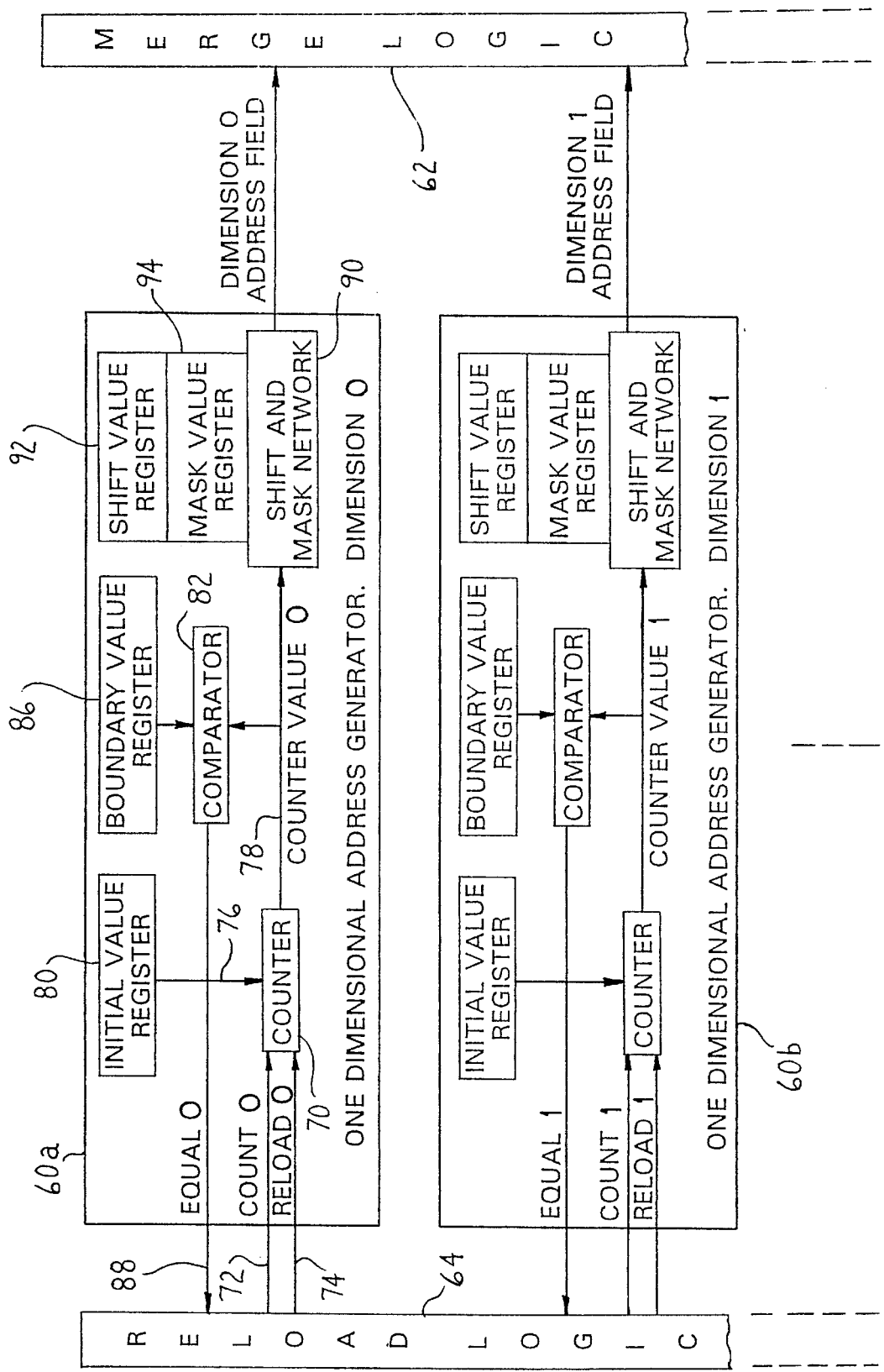
Figure 6B:
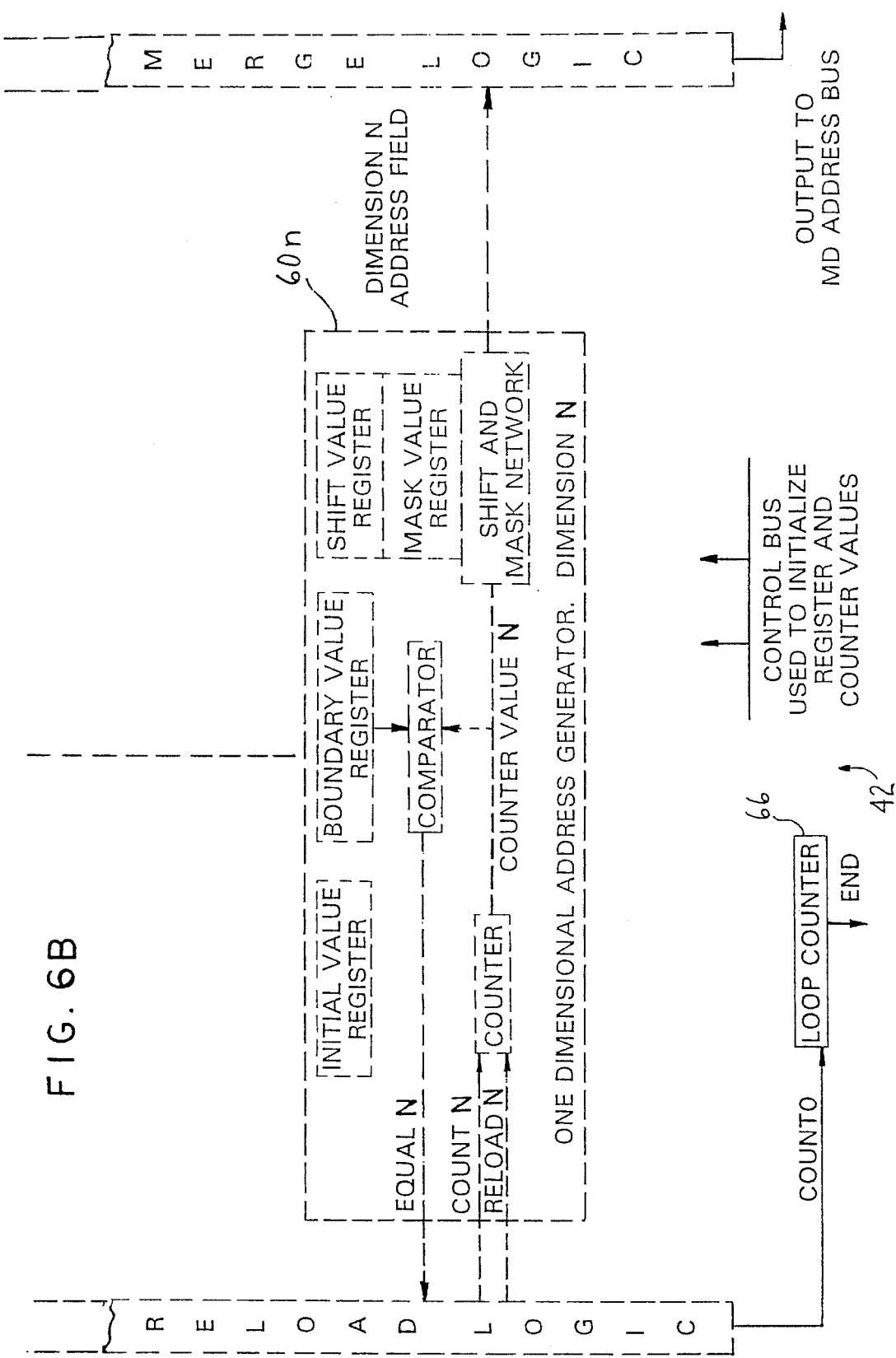
Figure 7:
Figure 8:
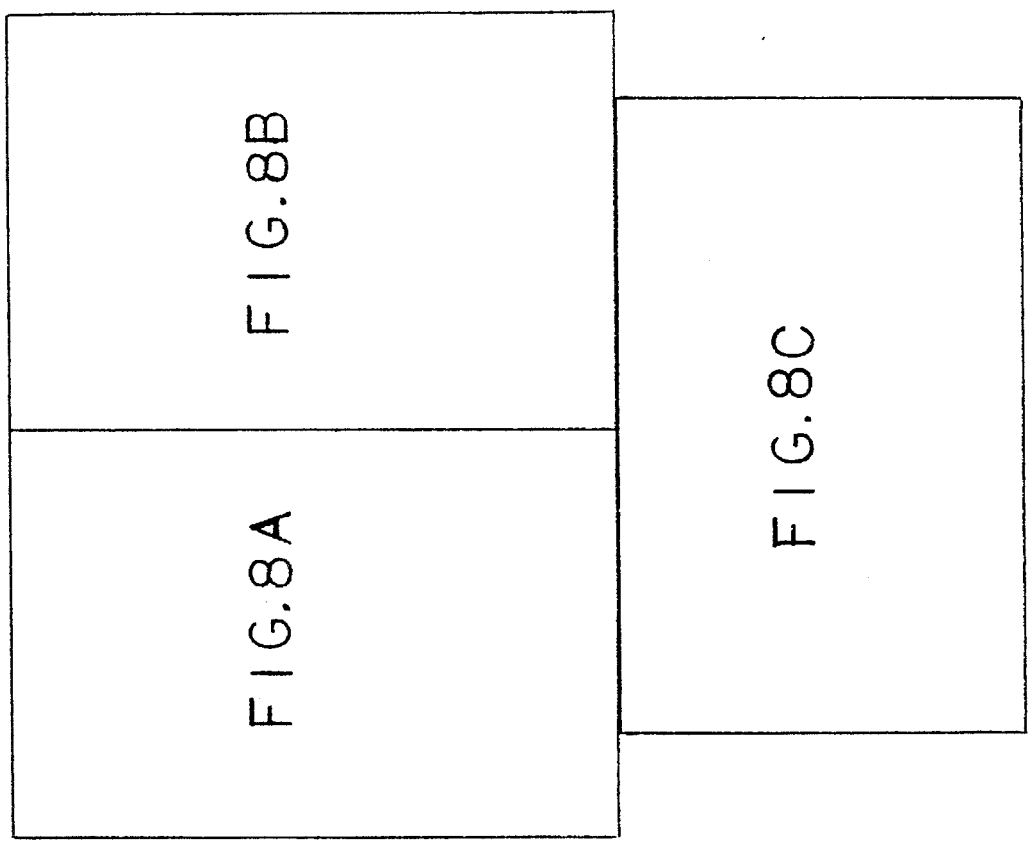
Figure 8A:
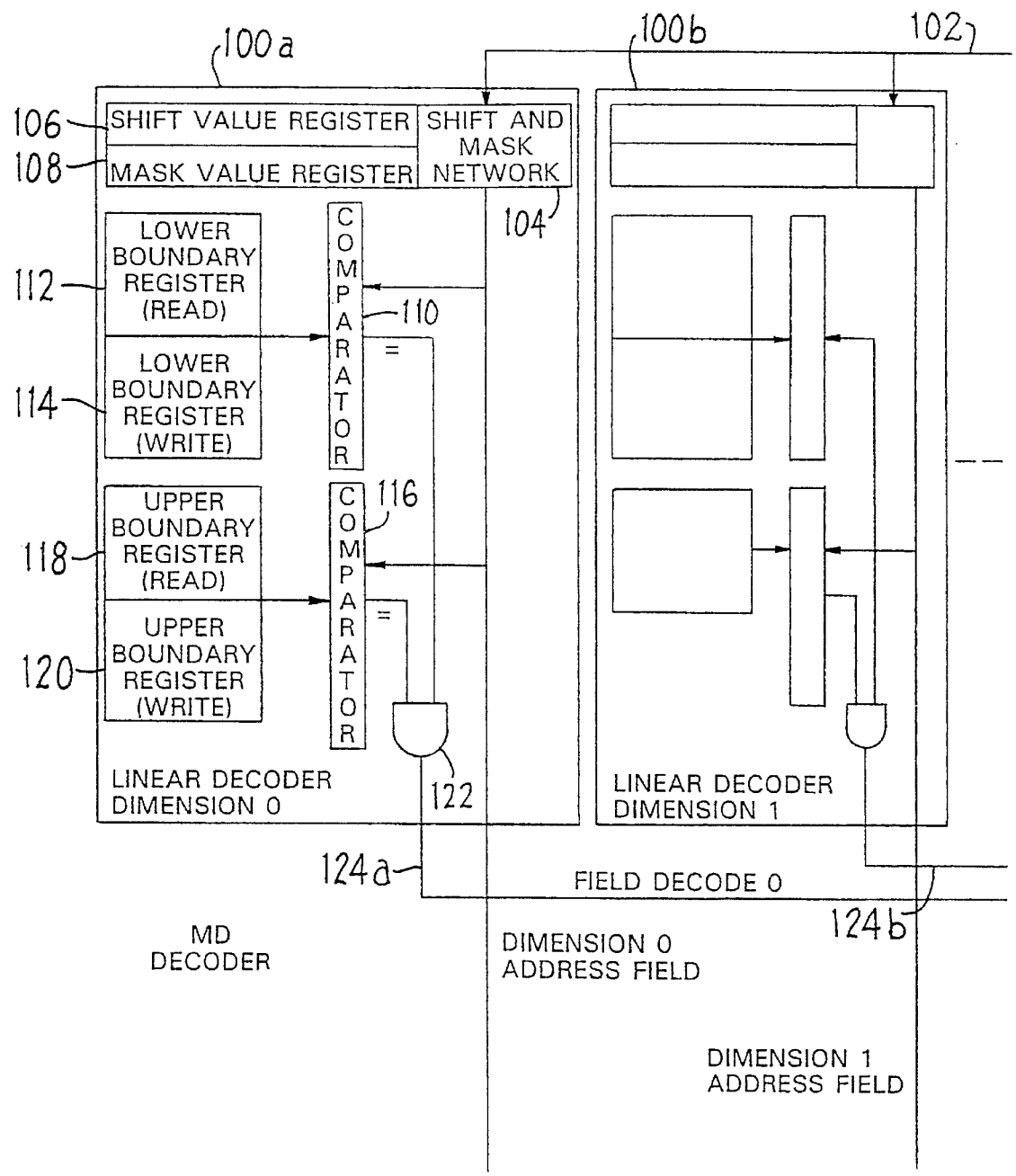
Figure 8B:
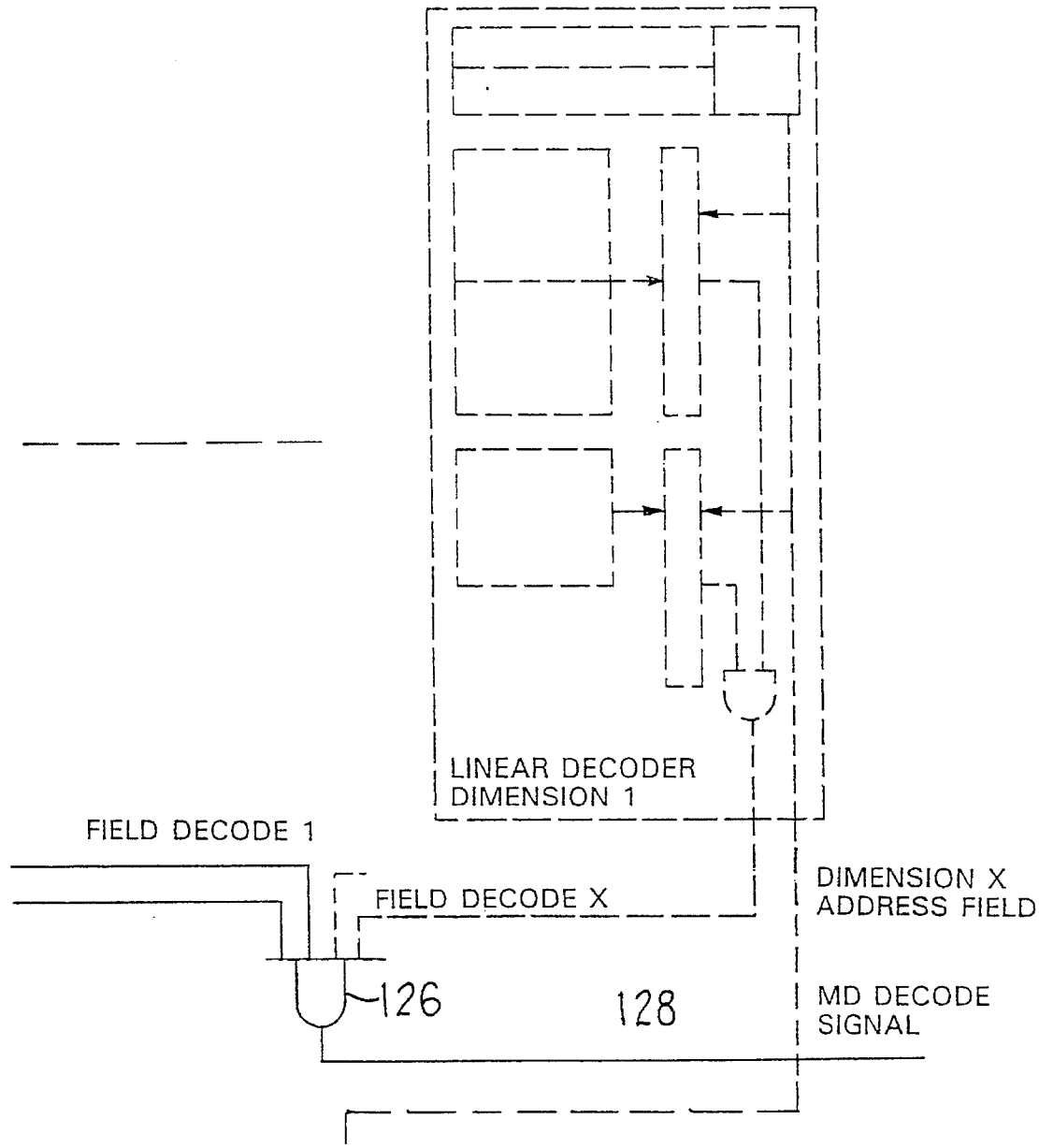
Figure 8C:
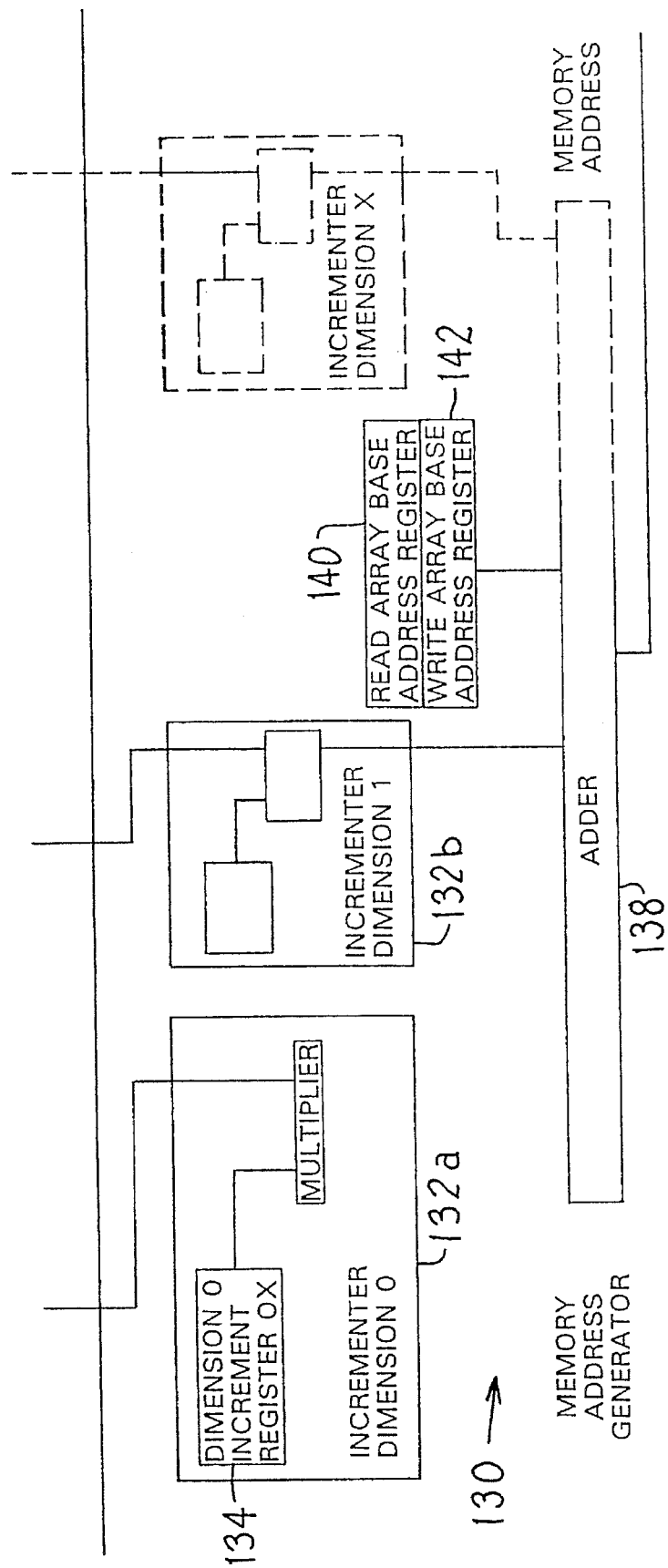
Figure 9:
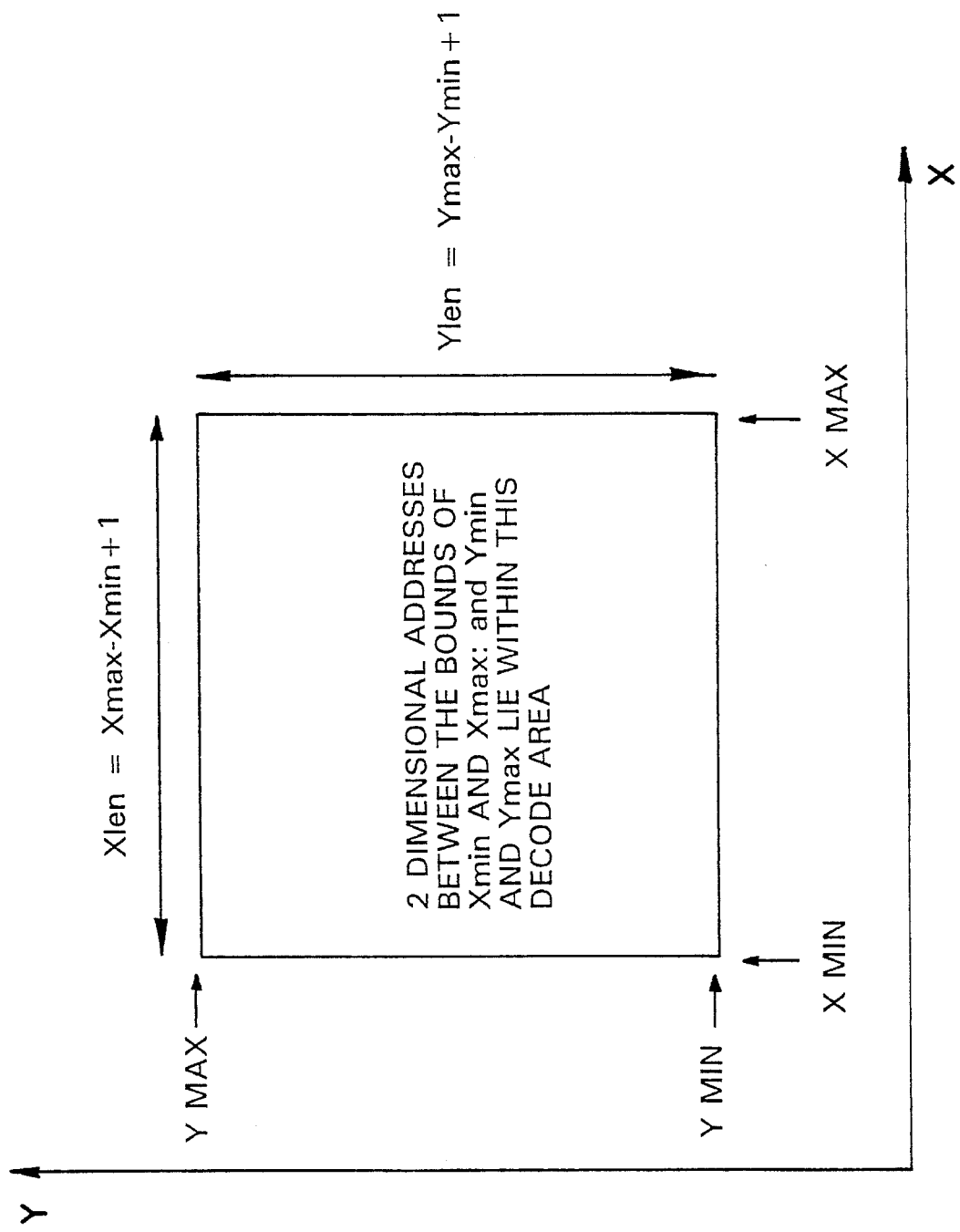
Figures 10A, 10B:
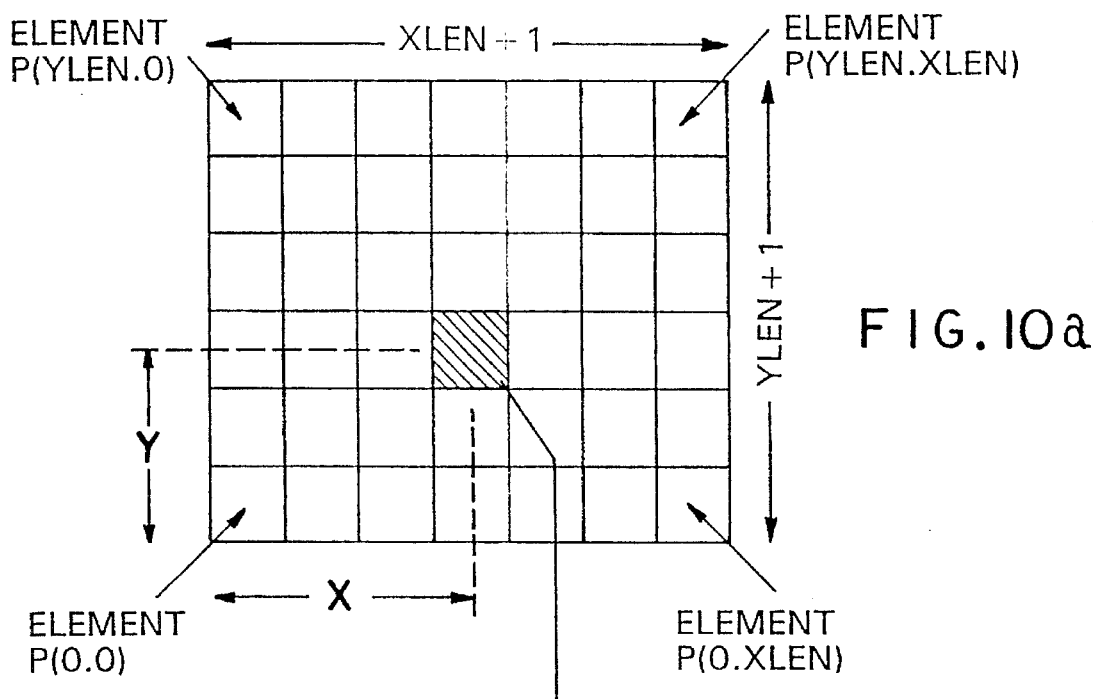

2a depicts in virtual form of how data is stored in a three-dimensional array;

FIG. 2b illustrates how the data stored in the three-dimensional array of FIG. 2a is stored in a series of linearly arranged individual addressable memory locations;

FIG. 2c illustrates how data is stored in one row of the three-dimensional array of FIG. 2a;

FIG. 2d illustrates how the data stored in the row of FIG. 2c are located in three adjacent linearly arranged memory locations;

FIG. 2e illustrates how data may be stored in one column of a three-dimensional array of FIG. 2a;

FIG. 2f illustrates how the data stored in the column of FIG. 2e is located in three linearly arranged memory locations that are spaced apart from each other by nine sequential address locations;

FIG. 3 illustrates how data stored in overlapping sections of an array may be selectively required by different processors;

FIG. 4a illustrates how source data stored in an array for a particular process may be executed in a row-by-row pattern by a number of different processors;

FIG. 4b illustrates how destination data for the data individual accessed in the row format of FIG. 4a may, after execution, be stored in a column format;

FIG. 4c illustrates the data movement required to transfer the row format-arranged data of FIG. 4a to the column format-arranged data of FIG. 4b;

FIG. 5 is a block diagram of an MIMD computer system;

FIG. 6 is block diagram illustrating how FIGS 6A and 6B are assembled together;

FIG. 6A and 6B when assembled together form a block diagram showing in more detail an address generator shown in FIG. 5;

FIG. 7 shows an example of the format of an MD address;

FIG. 8 is a block diagram illustrating how FIGS. 8A, 8B and 8C are assembled together;

FIGS. 8A, 8B and 8C when assembled together form a block diagram showing in more detail an MD decoder and memory address generator shown in FIG. 5;

FIG. 9 diagrammatically depicts a two-dimensional array of memory address locations, a sub-array of memory address locations within the two-dimensional array and how the sub-array defined by address Xmax, Xmin, Ymax and Ymin values;

FIG. 10a is a diagrammatic representation of a two-dimensional array of memory locations and of a particular array element having the address P(Y,X);

FIG. 10b is a memory map of a number of linearly arranged addresses illustrating how memory element P(Y,X) of FIG. 10a is stored in a linear address according to the formula BP+X +Y×(Xlen+1) wherein BP is the memory address base pointer location of the initial element, P(0,0), of the array;

FIG. 11a diagrammatically illustrates a 512 row ×512 column two-dimensional array and how sixteen processors may be employed so that each processor manipulates the data stored in 32 consecutive rows within the array;

FIG. 11b illustrates the array of FIG. 11a wherein the sixteen processors are configured so that each processor manipulates data stored in 32 consecutive columns of data stored within the array;

FIG. 11c illustrates the array of FIG. 11a wherein data is divided into 256 sub-arrays each having 32 rows and 32 columns wherein each of the initial rows is shown as having a single sub array, represented by a shaded block, that contains a data fragment that is processed by the same processor when undergoing the row processing represented by FIG. 11a and the column processing represented by FIG. 11b; and FIGS. 12a, 12b and 12c respectively illustrate the bus, address and data cycles of the computer system of this invention.

DETAILED DESCRIPTION

Referring to FIG. 5, a multiple instruction multiple data (MIMD) parallel computer system 30 includes sixteen data processors labelled 32a, 32b to 32p, respectively. For clarity, only the processors 32a, 32b and 32p are shown, however, the circuitry and connections for the processors 32a,b,p, are all similar, and it is to be assumed that the remaining processors are equivalent to those shown. In the present embodiment, the processors are 32-bit devices.

In an MIMD computer the individual processors operate independently, but often require data which is scattered throughout the system. Each processor 32a,b,p is connected by means of respective link 34 to a communication bus 36. The communication bus 36 includes a multi-dimensional (MD) parallel address bus 38 which is 32-bits wide, and a data bus 40 which is 64 bits wide. An MD address generator 42 is connected to the address bus 38 to supply MD addresses to the bus which addresses act as labelling information uniquely identifying data on the data bus 40.

Each processor 32 comprises a respective central processing unit (CPU) 48, a respective local memory 50 and a respective associated MD decoder and memory address generator 52 to act as a read detector and a write detector. Each decoder generator 52 has programmable upper and lower read limits and upper and lower write limits for each of the dimensions of the MD address. In use, the decoder generator 52 decodes multidimensional addresses received from the MD address bus 38 and, if the decoded address falls with the programmed limits of the MD address, the address is translated into a linear address to access the memory 50.

Each local memory 50 is connected by data inputs/outputs to both the data bus 40 and to the respective CPU 48. The connection to the data bus 40 has a higher priority than the connection to the CPU, so that whenever a valid MD address is decoded by the respective MD decoder and memory address generator 52, data is transferred between the data bus 40 and the local memory 50. If the respective CPU is currently accessing the local memory 50, its access is temporarily paused while data transfer to or from the data bus 40 takes place.

The system also includes a bulk memory 44 built from dynamic RAM, and having its data input/output connected to the data bus 40. In the present embodiment, the bulk memory is 256 bits wide, ie. each MD address accesses 256 data bits. The memory 44 has an associated MD decoder and memory address generator 46 which is connected to the MD address bus 38 to act as a read detector and a write detector.

The decoder generator 46 is similar to the decoder generator 52 described hereinbefore, having programmable upper and lower limits for each of the dimensions of the MD address.

The computer system includes therefore a plurality of data processors 32 and a communication bus 36, each processor being connected to the communication bus 36. The communication bus 36 carries data and associated labelling information uniquely identifying the data. Each processor 32 includes a read detector 52 connected to the communication bus 32 for detecting labelling information of data required by the data processor and means 34, 52 for reading from the communication bus the data corresponding to the detected labelling information. Each processor also includes a write detector 52 connected to the communication bus 36 for detecting labelling information of data currently stored in the processor, and means 34, 52 for writing to the communication bus the data corresponding to the detected labelling information.

The processors 32, the MD address generator 42 and the bulk memory 44 are each connected to a control bus 54. A control unit processor 56 supplies control data to the control bus 54 to manage the computer system. Referring to FIGS. 6A and 6B the MD address generator 42 comprises N+1 one dimensional address generators 60, where N is the maximum number of address dimensions that the hardware can accommodate, the lowest field being dimension zero. In the present embodiment, N=2, the addresses having dimensions 0, 1 and 2, and the corresponding address generators 60 being labelled 60a, 60b and 60c respectively. In other embodiments, more one dimensional address generators may be provided to allow for higher address dimensions, there being a respective address generator for each address dimension. The generator 42 also includes merge logic 62 to assemble the output from the address generators 60 as the MD address, and reload logic 64 to control increments between the generators 60. A loop counter 66 is connected to the reload logic to count through the number of addresses generated.

Each one dimensional address generator 60 includes a counter 70 having a COUNT input 72 and a RELOAD input 74, both fed from the reload logic 64, a reload value input 76 and an output 78. An initial value register 80 is connected to the reload value input 76. In use, when a reload signal appears at the RELOAD input 74, the counter 70 is reset to the value held in the initial value register 80. The counter output 78 is connected to the input of a comparator 82 which has a second input fed from a boundary value register 86, and an output 88 connected to feed to the reload logic. In use, when the value of the counter output 78 is equal to the value held in the boundary value register 86, the comparator 82 outputs an EQUAL signal to the reload logic. The counter output 78 is also connected to the input of a shift and mask network 90, with an associated shift value register 92 and an associated value register 94. In use, the network 90 shifts and masks the value of the counter output 78, depending on the values held in the registers 92 and 94, to form one field of the MD address. The output of the shift and mask network 90 is connected to the merge logic 62.

In use, the MD address generator 42 generates a sequence of MD addresses as follows:

The Control Processor 36 initialises the initial value, boundary value, shift value and mask value registers 80,86, 92,94, respectively and counter 70 in each of the one dimensional address generators 60 and also the loop counter 66. After each cycle the COUNT0 signal increments the dimension 0 counter 70a and decrements the loop counter 66. If any of the count values becomes equal to its corresponding boundary value then the EQUAL signal for that dimension is asserted. This in turn causes a RELOAD signal back to its own counter and a COUNT signal to the next highest dimension. The counter output of each dimension is shifted and masked to form the individual address fields, these are then concatenated by the merge logic 62 to form the MD Address output. The loop countrer 66 records the total number of addresses generated and stops the process at the end.

FIG. 7 shows the format at a typical MD address produced by MD address generator 42. It comprises the concatenation of a number of one dimensional address fields. The overall number and width of each address field is controlled by the control processor 56, which controls the shift and mask networks 90 of each one dimensional address generator 60. Referring to FIGS. 8A 8B and 8C each MD decoder and memory address generator 46,52a,b to 52p includes N+1 linear decoders 100a,b,c, connected in parallel to an MD address bus input 102. The MD address bus input 102 of each MD decoder is connected to the address bus (38 in FIG.

5). Each decoder 100 decodes a respective field of the MD address.

Each decoder 100 includes a shift and mask network 104 having an input connected to the MD address input 102, an associated shift value register 106 and an associated mask value register 108. In use, the network 104 extracts only certain bits of the MD address depending on the value held in the mask value register 108, and shifts the extracted bits down in significance depending on the value held in the shift value register 106.

The output from the network 104 is connected to the input of a second comparator 110, which has another input connected via a switch (not shown) to one of a read lower boundary register 112 and a write lower boundary register 114. The output from the second comparator 110 is a logical 1 (high) whenever the output from the network 104 is equal to or greater than the value in the selected lower boundary register. The output from the network 104 is also connected to the input of a third comparator 116 which has another input connected via a switch (not shown) to one of a read upper boundary register 118 and a write upper boundary register 120. The output from the third comparator 116 is a logical 1 (high) whenever the output from the network 104 is equal to or less than the value in the selected upper boundary register. The output from the second and third comparators 110,116 respectively are connected to respective inputs of an AND gate 122. The output 124 from the AND gate 122 is the respective field decode output for the linear decoder, e.g. the output 124a is the field decode output for the linear decoder 100a which decodes the dimension zero field of the MD address. Each respective output 124 is a logical 1 (high) only when the value of the respective field of the MD address lies between the lower and upper values stored in the selected lower and upper boundary value registers for the respective field decoder 100.

The outputs 124 from the decoders 100 are connected to respective inputs of an N+i input AND gate 126. The output 128 from the AND gate 126 is the MD decode output from the MD decoder, and is a logical 1 (high) only when the value of each field in the MD address lies between the lower and upper boundary values for the respective address field.

FIG. 9 shows an example of the decoding of a two dimensional address (y,x). The upper and lower boundary registers for the dimension zero (x) field of the address contain the values Xmax and Xmin, respectively. The upper and lower boundary registers for the dimension one (y) field of the address contain the values Ymax and Ymin, respectively. A decode signal will appear at the output 128 only when the value of x lies between Xmin and Xmax, and the value of y lies between Ymin and Ymax.

Referring again to FIG. 8, each of the MD decoder and memory address generators 46,52 also includes a linear address generator 130 for generating a local memory location address from a decoded MD address. The linear address generator 130 includes N+1 field incrementers 132 each comprising a respective field increment register 134 connected to one input of a respective parallel multiplier 136. The output from the respective shift and mask network 104 is connected to another input of the parallel multiplier 136. The output from the multiplier 136 is taken as the output from the respective field incrementer 132, and each output is connected to a respective input of a parallel adder 138. The adder 138 also has an input connected by a switch (not shown) to one of a read array base address register 140 and a write array base generator 142. In use, each incoming decoded field address from the respective shift and mask networks 104 is multiplied in a respective field incrementer 132 by the increment value stored in the respective field increment register 134. The resulting product values are then combined in the adder together with the base address value stored in the read or write base address register. The output from the adder 138 corresponds to a linear address of a local memory location.

If Da is the value stored in the dimension zero field increment register 134a, and Db is the value stored in the dimension one field register 134b, and the array base address is BP, the linear memory address output from the MD decoder and memory address generator will be of the form Memory address=BP+(Aa×Da)+(Ab×Db)+ where Aa, Ab, etc. are the values of the decoded field addresses for the dimension zero, dimension one, etc., respectively fields of the MD address.

FIG. 10a shows a diagrammatic representation of a two dimensional array to be stored in memory. Each element in the array is addressable as an (y,x) co-ordinate. The array extends between the value 0 and Xlen in the x direction, and between the values 0 and Ylen in the y direction. To store this array in memory, the values of the variables in the above equation would be:

$Da=Dx=1$ $Db=Dy=Xlen+1$ and Address P(x,y)=BP +x+y (Xlen+1). The way in which the elements of the array are stored in the memory is shown in FIG. 10b, the base address BP corresponding to the position of the element P(O,O).

Referring to FIG. 5, the data bus 40 is made as wide as is convenient, wider than the length of a data word. A highly parallel bus architecture, known in itself, is used to achieve high bus performance. Data transfers on the bus are restricted to a minimum block size corresponding to the width of the data bus. The bus cycle time is made as short as possible within the constraints of available technology and system cost.

In the present embodiment, the data bus 40 is 64 bits wide and the bulk memory 44 is 256 bits wide. The period of each MD address cycle is 320 ns, and during each MD access the 256 bits are transferred to the data bus as four 64-bit wide 'bus words'. Each bus word is transferred on a 'data cycle' of period 80 ns (320 ns/4). The effect of such a configuration is to increase the memory bandwidth, each address access comprising a block of contiguous data many bytes long. At the same time, the period of each MD address cycle is sufficient to allow the normally slower MD address decoding logic to function.

Each processor 32 has a further shift and mask network (not shown) at its input/output connection to the data bus 40. The shift and mask network can selectively access data on the data bus 40 to a resolution of 8 bits, in effect adding a further addressing stage of the data. The shift and mask network is controlled by the MD decoder and linear address generator to enable data to be read or written within the contiguous block.

Owing to the time required by the MD address decoders 46, 52 to decode, and compare the MD address with the read and write, upper and lower boundary values, the data cycles during which data is transferred on the data bus 40 are delayed in time behind the corresponding address cycle of the MD address on the MD address bus 38. In this way, the associated address and data information are pipelined.

FIGS. 12a, 12b and 12c shows an example of the transfer of address and data information on the communication bus.

Referring to FIG. 12a, address and data information is transferred on the communication bus in syncronisation with continuous bus cycles 160a, 160b, 160c, etc. (each of period 320 ns). An address cycle 162a (FIG. 12b) coincides with a bus cycle 160a. The corresponding data cycles 164a appear on the data bus during the subsequent bus cycle 160b. During this subsequent bus cycle 160b, a next MD address cycle 162b occurs, but the data cycles 164b carrying the data information associated with the MD address cycle 162b do not appear on the data bus until the further bus cycle 160c. Thus, the associated address and data cycles are pipelined. As explained hereinbefore, such a configuration allows efficient operation of both the address bus 38 and the data bus 40 while still allowing a pause (320 ns) in which the MD address decoding logic and memory access can operate.

In use, the control processor 56 provides initialisation and run-time control for all parts of the computer system 30 by means of the control bus 54. Non-local data transfers, i.e. inter processor transfers and processor/bulk memory transfers, take place by means of the data bus 40 and the MD address bus 38. All non-local data transfers take the form of Direct Memory Access (DMA) block transfers.

During non-local data transfers, the MD address generator 42 supplies a sequence of MD address to the MD address bus 38 under the control of the control processor 56. Each address is supplied to the address bus during an address cycle. Within the MD decoders, each address cycle is split into a write cycle followed by a read cycle.

During the write cycle, the MD address is compared with the boundary values stored in the upper and lower write boundary registers 120, 114 respectively. If the MD address falls within all the boundary values for the particular decoder, the MD decode signal for that decoder is asserted, and a linear memory write address is obtained.

During the subsequent read cycle, each MD decoder and memory address counter compares the MD address fields with the boundary values held in each of the upper and lower read boundary registeres 118, 112 respectively. If the MD address falls within all of the boundary values for the particular decoder, the MD decode signal for that decoder is asserted, and a linear read address is obtained.

If the MD address does not fall within the read or write, upper and lower boundary address for the particular decoder, no MD decode signal is asserted, and the output from the MD decoder and linear address generator remains dormant.

Depending on the respective outputs of the MD decoders 52 in the processors 32, and the MD decoder 46 of the bulk memory 44, each processor and the memory will, independently of one another, write, read or ignore data on the data bus. For there to be data on the databus 40, one of the processors 52 or bulk memory 44 must write data to the data bus. Only one such device should write data to the data bus for any given MD address. The hardware must be protected against bus contention in the event that two or more devices attempt to write data simultaneously. For any given MD address, one or more of the processors 32 and/or the bulk memory 44 may read data from the data bus 40 simultaneously.

Therefore, during each bus cycle, data may be both read from and written to different areas of the same memory. In this event, the respective MD decoder and memory address generator may operate to address independent read and write arrays. This is achieved by setting the values of the respective read array base address register 140 and the respective write array base address register 142 to point to different base addresses for the read and write arrays.

In the embodiment described above, data stored in an array may be transferred and distributed across a number of processor memories. By programming the read boundary values of the desired array blocks for each processor, the transfer of the data can be accomplished by the system in a single pass through the array addresses. During the transfer, each processor recognises data it should read by the MD address being between its preprogrammed boundary addresses, and the recognised data is read into the processor automatically. Where several processors require overlapping blocks of data, the respective boundary registers are set up with overlapping address fields. Each processor can read the data independently of the other processors, and the appropriate data is distributed to each processor during the single pass.

The source data for the array may also be distributed across a number of processors. By programming the write boundary values of the source data held by each processor, the appropriate source data will be transferred automatically from the respective processor to the data bus when the MD address is between the write boundary values for the respective processor.

Since, as explained above, both source and destination arrays may be distributed across a number of processors, the system allows the re-ordering or re-distribution of such data arrays between the processors, using only a single pass through the array addresses. Each processor is set up with the write boundary addresses for the data it currently holds, and the read boundary addresses for the data it is to read. During the transfer, the appropriate data for each MD address is written from a processor to the data bus, and the data is then read into the appropriate destination processor or processors. The redistribution of data between the processors and the bulk memory may also be accomplished using a similar transfer.

Referring to FIG. 11, the redistribution of data can be illustrated by an example in which a two stage algorithm requires a redistribution of data between the first and second stages. A typical algorithm is a two dimensional Fast Fourier Transform (FFT). The data consists of 512 by 512 complex numbers which are stored in a three dimensional data array of size 2×512×512 (512K words). The 2D FFT algorithm comprises 512 one dimensional FFTs executed on the rows of data followed by 512 one dimensional FFTs executed on the columns of data. During the first phase of the algorithm accesses only take place along the direction of the rows and similarly in the second phase of the algorithm data accesses take place along the direction of the columns. The algorithm can therefore be split between the 16 processors very easily by giving each one 32 rows of data to transform in the first phase (FIG. 11a) and 32 columns of data to transform in the second phase (FIG. 11b). Between the first and second algorithm phases the Communication Bus is used to move the data between two buffers achieving a re-distribution from row format to column format at the same time. FIG. 11c shows the 256 data fragments which are automatically routed between the 16 processors by the Communication Bus. Sixteen of these actually have the same source and destination processor although the data still gets copied from one buffer to the other.

Although in the embodiment described above the computer system includes sixteen processors 32, it will be appreciated that in other embodiments a similar architecture may use more or less processors, for example two processors, or thirty-two processors. In the preferred embodiment, the architecture allows new processors to be "plugged in" to the communication bus, or faulty or dormant processors to be switched out. When adding or removing processors, the software for the control unit processor has only to be reloaded and supplied with updated information of which processors are in use. It will be appreciated that in the embodiment described above, the hardware directly supports information organised in multi-dimensional data arrays. Individual processors can conveniently access any part of the data arrays by means of the communication bus, even though the data in the array may itself be distributed across the many physically separate memories of the system. The system may execute efficiently a variety of different algorithms, including those requiring a high proportion of data interchange between the processors. The method of access, the transfer latency and transfer speed are independent of the physical location of the data. The programming of the system in order to use the parallel hardware resources efficiently therefore requires little additional effort compared to programming a single processor system.

It will also be appreciated that in the embodiment described above, each processor receives precisely the subset of data it requires, thereby optimising the usage of local memory. When several processors require some part, or all, of the same data, they each receive the appropriate parts during the same access cycle, thereby making efficient use of the available communication bandwidth.

It will be appreciated further that in the embodiment described above, data organised in multi-dimensional arrays is moved within the system while it is still in the multi-dimensional array format. The data does not have to be "unpacked" into a linear format, and then "repacked" into an array format in each processor. Data can also be transferred from the system to an external device while still in the multi-dimensional format.

A computer system in accordance with the invention is for example suitable in applications such as image processing, computer graphics, computer aided design and scientific computing.

We claim:

1. A multiprocessor computer system comprising:

a communication bus for carrying data and associated address information for said data;

a multidimensional address generator coupled to said communication bus for generating multidimensional address information for data carried on said communication bus, said associated address information including said multidimensional address information; and a plurality of data processing units coupled to said communication bus, each said data processing unit including:

a local memory coupled to said communication bus, said local memory including plurality of individually addressable memory locations for storing data and being configured to write data to said communication bus in response to receipt of a Write signal and to read data from said communication bus in response to receipt of a read signal:

read detector means coupled to said communication bus and programmed to detect first multidimensional address information corresponding to data required by the data processor and when said first multidimensional address information is detected, to assert said read signal to said local memory;

write detector means coupled to said communication bus and programmed to detect second multidimensional address information different from said first multidimensional information corresponding to data currently stored in the data processor and when said second multidimensional address is detected, to assert said write signal to said local memory; and a local address generator connected to said communication bus for receiving said multidimensional address information therefrom and configured to generate a local memory address into which data is to be written to or read from, based on said multidimensional address information, said local address generators being independently programmable so as to selectively generate different local memory addresses for a single set of multidimensional address information.

2. A computer system according to claim 1, wherein the communication bus comprises a data bus for carrying the data and an address bus for carrying the associated multidimensional address information.

3. A computer system according to claim 2, wherein the data bus comprises a parallel bus, the width of which is greater than the size of a data word, whereby data can be communicated as a plurality of data words in parallel.

4. A computer system according to claim 1, wherein the read detector means includes a lower boundary register for each address dimension for holding a lower read boundary value therefor, an upper boundary register for each address dimension for holding an upper read boundary value therefor, and wherein the read detector means generates an output decode signal whenever each address dimension of one of the multidimensional addresses on said communication bus is between the respective upper and lower read boundary values therefor.

5. A computer system according to claim 1, wherein the write detector means includes a lower boundary register for each address dimension for holding a lower write boundary value therefor, an upper boundary register for each address dimension for holding an upper write boundary value therefor, and wherein the write detector means generates an output decode signal whenever each address dimension of one of the multidimensional addresses on said communication bus is between the respective upper and lower write boundary values therefor.

6. A computer system according to claim 1 wherein the address generator generates a sequence of adjacent addresses, the sequence corresponding to a block of data.

7. A computer system according to claim 1, further comprising a control unit processor connected to each of the data processing units by means of a control bus, said control unit processor controlling the read and write detector means and the local address generator of each data processing unit so as to cause said read detector means to selectively operate on different first multidimensional information, said write detector means to selectively operate on different second multidimensional information and said local address detectors to selectively generate different local memory addresses.

8. A computer system according to claim 1, wherein at least one said data processing unit includes a central processing unit configured to manipulate data contained in said local memory.

9. The computer system according to claim 1, wherein at least one data processing unit includes a bulk memory unit, said local memory of said bulk memory unit serving as the bulk memory.

10. The computer system according to claim 1, wherein said read detector means and said write detector means constructed as a unitary detector.

11. A method of data communication in a computing system which includes a communication bus and a plurality of data processing units coupled to said communication bus, the digital processing units each having a local memory with selectively addressable memory locations from which data can be written to the communications bus or read from the communications bus for storage, the method comprising the steps of:

supplying multidimensional address information to said communication bus, said multidimensional address information being associated with and uniquely identifying data carried by the communication bus;

programming each data processing unit with read detection information of multidimensional address information corresponding to data which the data processing unit requires and when said programmed read detection information matches said multidimensional address information on the communication bus, causing the data processing unit local memory to read the data from the communication bus;

programming each data processing unit, independently of said programming thereof with read detection information of multidimensional address information, with write detection information of multidimensional address information corresponding to data which the data processor currently stores and when said programmed write detection information matches said multidimensional address information on the communication bus, causing the data processing unit local memory to write data to the communication bus; and generating for each digital data processing unit a local memory address based on said multidimensional address information into which data is to be written to or read from the communication bus, wherein the local memory addresses for the individual data processing units are generated independently of each other so as to selectively cause the generation of different local memory addresses based On the same said multidimensional address information.

12. A method of data communication according to claim 11, wherein the read detection information corresponds to a contiguous block of data, and wherein the write detection information corresponds to a contiguous block of data.

13. A method of data communication according to claim 11, wherein for each address of the multidimensional address information, the data processors operate on a write cycle during which data is supplied to the bus, followed by a read cycle during which data is read from the bus.

14. The method data communication according to claim 11, further including the step of programming digital data processing units with said read detection information so that when selected multidimensional address information data from the communication bus will be read into the local memory of a first data processing unit and will not be read into the memory of a second data processing unit.

15. The method of data communication of claim 11, wherein digital data processing units are programmed with write detection information so that for each set of multidimensional address information, only data from single data processing unit local memory unit is written onto the communications bus.

16. A multiprocessor computer system comprising: a communication bus for carrying data and associated address information for said data; a multidimensional address generator coupled to said communication bus for generating multidimensional address information for data carried on said communication bus, said associated address information including said multidimensional address information; and a plurality of data processors coupled to said communication bus, each said data processor including: read detector means coupled to said communication bus and programmed to detect first multidimensional address information corresponding to data required by the data processor; means coupled to said read detector means for reading data corresponding to said first multidimensional address information from said communication bus; write detector means coupled to said communication bus and programmed to detect second multidimensional address information corresponding to data currently stored in the data processor, said write detector means being programmed independently of said read detector means; and means coupled to said write detector means for writing to said communication bus data corresponding to said second multidimensional address information; wherein the multidimensional address generator includes for each address dimension a counter, an initial value register having an output coupled to an input of said counter, a comparator having a first input coupled to an output of said counter, and having a second input and an output, a boundary value register having an output coupled to said second input of said comparator, a shift value register, a mask value register, and a shift and mask network having an input to which said output of said counter is applied and responsive to values in said shift value register and said mask value register for producing an output which is said output of said counter shifted by an amount specified by the value in said shift value register and masked as a function of the value in said mask value register; said multidimensional address generator also including control means for causing each of said counters to be loaded with a value from the initial value register connected thereto, for thereafter periodically causing a first of said counters to be incremented, and responsive to actuation of the output of each said comparator for reloading the counter coupled to that comparator from the initial value register coupled to that counter and for incrementing a respective one of said counters other than said first counter; and said multidimensional address generator further including merge means for combining the outputs from each of said shift and mask networks into a single multidimensional address for said communication bus.

17. A computer system according to claim 16, wherein said read and write detector means of each said data processor includes register means for defining a shift value and a mask value, a further shift and mask network having an input coupled to said communication bus and responsive to said register means for producing an output which is a multidimensional address from said address bus shifted by an amount corresponding to said shift value and masked in accordance with said mask value, a lower read boundary register, a lower write boundary register, a lower boundary comparator for comparing the output of said further shift and mask network with a selected one of said lower read boundary register and said lower write boundary register, an upper read boundary register, an upper write boundary register, and a write boundary comparator for comparing the input of said further shift and mask network with a selected one of said upper read boundary register and said upper write boundary register; said read and write detector means further including AND gate means having a plurality of inputs, said lower boundary comparators and said upper boundary comparators each having an output coupled to a respective input of said AND gate means, said AND gate means having an output which serves as a decode signal to the data processor.

18. A computer system according to claim 17, wherein each said data processor includes a plurality of dimension increment registers, a plurality of multipliers which each have one input coupled to an output of a respective said dimension increment register and a second input coupled to an output of a respective said further shift and mask network, a read array base address register, a write array base address register, and adder means coupled to said multipliers and to said read array base address register and write array base address register for outputting a memory address which is a sum of an output from each of said multipliers and an output from a selected one of said read array base address register and said write array base address register.

19. A multiprocessor computer system comprising:
   a communications bus for carrying data and address information for the data;
   an address generator for generating a system address representative of a system address from which the data is to be read from and written to;
   a plurality of digital data processing units (DDPUs), each digital data processing unit including:
      a local memory connected to said communications bus for writing data to and reading data from said communications bus, each DDPU local memory including a plurality of individually addressable memory locations into which data is retrieved from for writing onto said communications bus and to which data is written from said communications bus for storage, said DDPU local memory being configured to write data onto said communications bus in response to receipt of a bus write signal and to read data from said communications bus for storage in response to a read bus signal, said DDPU local memory retrieving data from and writing data into said memory locations in response based on a received local memory address;
      a write address decoder connected to said communications bus for reading said system addresses therefrom and to said associated DDPU local memory for forwarding said write bus signal thereto, said write bus decoder being configured to calculate at least one write boundary address in response to the receipt of write boundary data thereto, to compare said systems address to said at least one write boundary address and, if said systems address is the same as said at least one write boundary address, to assert said write bus signal;
      a read address decoder connected to said communications bus for reading said system address therefrom and connected to said associated DDPU local memory for transmitting said read bus signal thereto, said read address decoder being configured to calculate at least one read boundary address in response to receipt of read boundary data thereto, to compare said system address to said at least one read boundary address, and, if said system's address is the same as said at least one read boundary address, to assert said read bus signal; and
      a linear address generator connected to said communications data bus to receive said system address, said linear address generator being configured to receive incrementing data, to generate a local memory address based representative of a location in said associated DDPU local memory from which data is to be retrieved for writing or written into for storage based on said system address and said incrementing data and to forward said local memory address to said associated DDPU local memory; and
   a control processor connected to each said digital data processor for supplying said write boundary data, said read boundary data and said address incrementing data thereto, said control process bring configured to: generate said write boundary data for said DDPU write address decoders, so that for each said system address, only a single write address decoder will generates a write bus signal; generate said read boundary data to said individual DDPU read address decoders so that for at least one said system address, one DDPU read address decoder asserts a read bus signal and a second of said DDPU signal decoders does not assert a read bus signal; and generate said incrementing data signals to said individual DDPU linear address generators so that for at least one system address, at least two said DDPU linear address generators will generate local memory addresses to cause the data to be read into different locations in said individual DDPU local memories associated with said at least two linear address generators.

20. The multiprocessor computer system of claim 19, wherein said write address decoder and said read address decoder associated with a digital data processing unit is constructed as a single read/write address decoder, said read/write address decoder including a first set of registers for storing said write boundary data and a second set of registers for storing said read boundary data.

21. The multiprocessor computer system of claim 20, wherein each said DDPU linear address generator is connected to said associated DDPU read/write address decoder for receiving said communications bus system addresses therefrom.

22. The multiprocessor computer system of claim 19, wherein each said DDPU write address decoder is configured to calculate a plurality of write boundary addresses in response to the receipt of said write boundary data, to compare said write said system address to said plurality of write boundary addresses and, if said system address is the same as one of said write boundary addresses, to generate said write bus signal.

23. The multiprocessor computer system of claim 19, wherein each said DDPU read address decoder is configured to calculate a plurality of read boundary addresses in response to the receipt of said read boundary data, to compare said read said system address to said plurality of read boundary addresses and, if said system address is the same as one of said read boundary addresses, to generate said read bus signal.

24. The multiprocessor computer system of claim 19, wherein: said address generator is configured to generate said system addresses as multi-dimensional addresses, each said system address having a plurality of dimensional components, each said dimensional component representative of a system address along one particular dimensional component thereof; and
   each said digital data processing system write address decoder includes a plurality of dimensional decoders, each said dimension decoder being configured to calculate a boundary of dimensional addresses based on write boundary dimensional data supplied thereto, to compare dimensional component data extracted from said system address to said boundary range and to assert a boundary conformance signal if said extracted dimensional component data is within said boundary range; and said write address decoder generates said write bus signal when each said dimension decoder asserts associated a boundary conformance signal;
   each said digital data processing system read address decoder includes a plurality of dimensional decoders, each said dimension decoder being configured to calculate a boundary of dimensional addresses based on read boundary dimensional data supplied thereto, to compare dimensional component data extracted from said system address to said boundary range and to assert a boundary conformance signal if said extracted dimensional component data is within said boundary range; and said read address decoder generates said read bus signal when each said dimension decoder asserts associated a boundary conformance signal; and said control processor generates said write boundary data as at least one set of write boundary dimensional data and said read boundary data as at least one set of read boundary dimensional data.

25. The multiprocessor computer system of claim 24, wherein each said digital data processor unit linear address generator includes plurality of incrementing units configured to receive each said incrementing unit being configured to receive dimensional address from one said dimensional detector and to compute an addend from said dimensional address and an increment factor and said linear address generator includes add circuit for combining said addends to produce said local memory address.

26. The multiprocessor computer system of claim 20, wherein:

said address generator is configured to generate said system addresses as multi-dimensional addresses, each said system address having a plurality of dimensional components, each said dimensional component representative of a system address along one particular dimensional component thereof; and each said digital data processing system read/write address decoder includes a plurality of dimensional decoders, each said dimension decoder is configured to calculate a boundary of dimensional addresses based on write boundary dimensional data supplied thereto, to compare dimensional component data extracted from said system address to said boundary range and to assert a boundary conformance signal if said extracted dimensional data is within said boundary range; and said DDPU read/write address decoder is configured to generate said write bus signal when each said dimension decoder asserts associated a boundary conformance signal, and each said dimensional decoder is further configured to calculate a boundary of dimensional addresses based on read boundary dimensional data supplied thereto, to compare dimensional component data extracted from said system address to said boundary range and to assert a boundary conformance signal if said extracted dimensional component data is within said boundary range; and said DDPU read/write address decoder is configured to generate said read bus signal when each said dimension decoder asserts associated a boundary conformance signal; and said control processor generates said write boundary data as at least one set of write boundary dimensional data and said read boundary data as at least one set of read boundary dimensional data.

27. The multiprocessor computer system of claim 26, wherein each said digital data processor unit linear address generator includes plurality of incrementing units configured to receive each said incrementing unit being configured to receive dimensional address from one said dimensional detector and to compute an addend from said dimensional address and an increment factor and said linear address generator includes add circuit for combining said addends to produce said local memory address.

28. In a multiprocessor computer system including a communication bus for carrying data and associated address information uniquely identifying the data, a data processing unit comprising:

a local memory coupled to said communication bus, said local memory including a plurality of individually addressable memory locations and being configured to write to said communication bus in response to receipt of a write signal and to read data from the communication bus in response to receipt of a read signal;

a read detector coupled to the communication bus and programmed to detect the first address information on the communication bus of data required by said data processor and when said first address information is detected, to assert said read signal to said local memory;

a write detector coupled to the communication bus and programmed to detect second address information on the communication bus different from said first address information, and when said second address information is detected, to assert said write signal to said local memory; and a local address generator connected to said communication bus for receiving said address information therefrom and configured to generate a local memory address into which data is to be written to or read from based on said address information, said local address generator being independently programmable so as to selectively generate different local memory addresses for a single set of multidimensional address information.

\* \* \* \* \*

UNITED STATES PATENT AND TRADEMARK OFFICE
CERTIFICATE OF CORRECTION

PATENT NO. : 5 586 256
DATED : December 17, 1996
INVENTOR(S) : Geoffrey L. Thiel et al It is certified that error appears in the above-indentified patent and that said Letters Patent is hereby corrected as shown below:

Column 11, line 52; change "Write" to ---write---.
Column 12, line 39; change "claim 1 wherein" to
---claim 1, wherein---.
Column 13, line 34; change "On" to ---on---.

Signed and Sealed this

Twenty-second Day of July, 1997

Attest:

BRUCE LEHMAN

*Attesting Officer*     *Commissioner of Patents and Trademarks*